United States Patent Office 2,745,810
Patented May 15, 1956

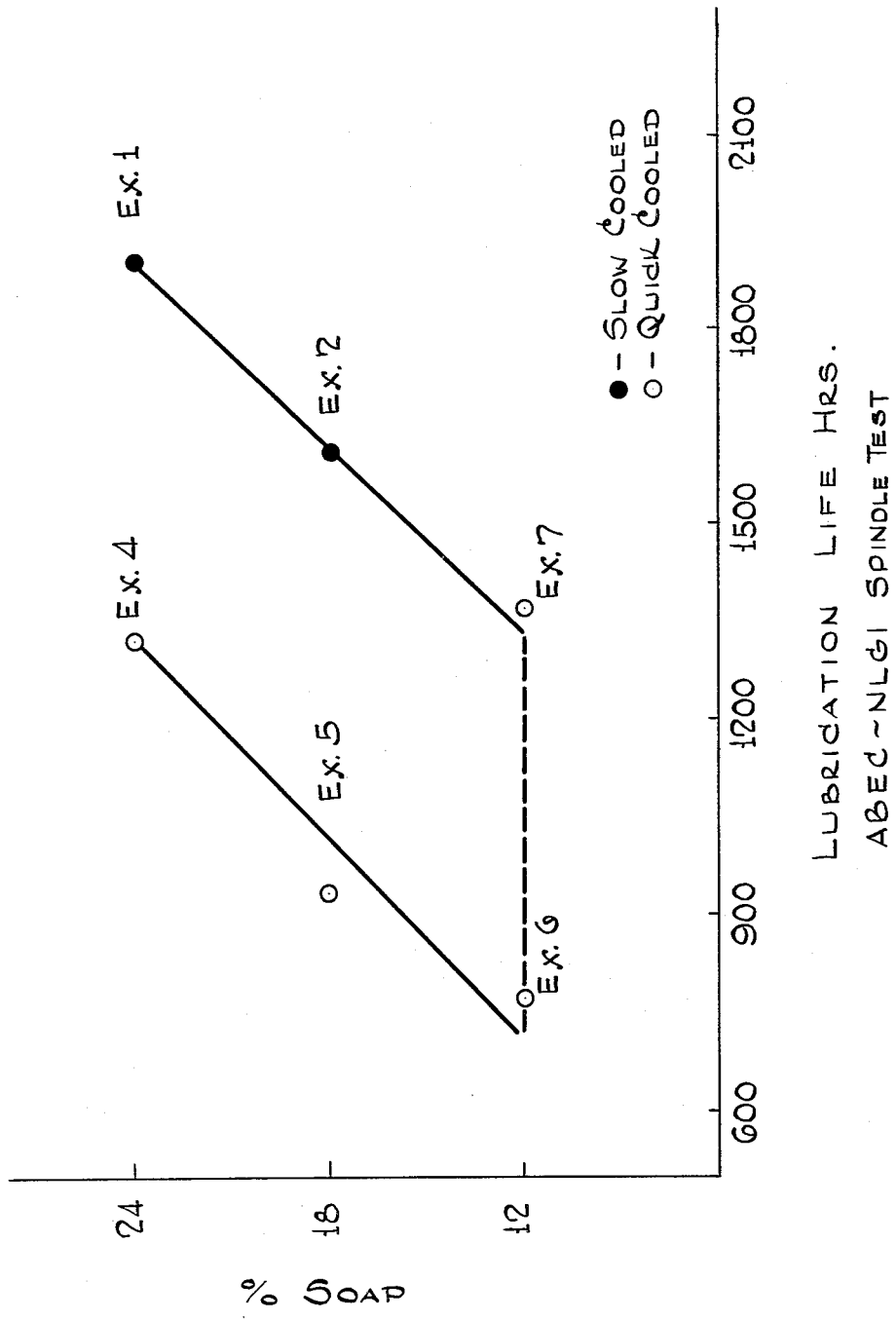

2,745,810

PROCESS FOR PREPARING LUBRICATING COMPOSITIONS

Arnold J. Morway, Clark Township, Union County, N. J., and Lewis C. Dawson, Baton Rouge, La., assignors to Esso Research and Engineering Company, a corporation of Delaware Application May 2, 1952, Serial No. 285,712

5 Claims. (Cl. 252—41)

This invention relates to lubricating grease compositions useful for the lubrication of high temperature anti-friction bearings and a process for their preparation. Particularly the invention relates to a process for preparing anti-friction bearing lubricants comprising adding a high viscosity index mineral oil to a mixture of complex soap forming materials and a low viscosity index oil, rapidly chilling the mixture and then subjecting the mixture to the action of high rates of shear without concurrent mixing.

For lubricating some types of anti-friction bearings, particularly ball bearings, the grease composition necessary to furnish the desired long and continuous lubrication at elevated temperature is a "channeling" type grease. That is to say, a grease which gives a low torque and low bearing temperature rise is needed since in an operating bearing of this type the major portion of the grease is pushed out of the path of the rolling elements during the first few revolutions of the bearing and remains out of this path. Thus no unnecessary power loss or heat build-up occurs in moving the grease in the bearing after the first few minutes of operation. This "immediate channeling" type grease is obtained in the prior art by high soap concentration, the grease structure being modified during manufacture to obtain a relatively high penetration. The excess grease thrown out of the ball path then acts as a lubricant reservoir and as a seal to prevent entrance of dirt and other undesirable contaminants into the lubricated bearing. The requirements of a grease of this type are as follows: a high dropping point, usually in excess of about 350° F.; soft, unctuous characteristics; and a stable structure, as indicated by an ASTM worked penetration value of 200 to 350 mm./10. An excellent channeling type grease is described in detail in United States Patent No. 2,265,791 issued December 9, 1941, to Zimmer and Morway. The grease composition of this patent is prepared by thickening a mineral lubricating oil to a grease consistency with a relatively large proportion of the sodium soap of refined rapeseed oil. There is also present in the finished formulation a slight excess of sodium hydroxide. There may also be present, if desired, a small percentage of an oil soluble petroleum sulfonate. This grease composition gives excellent long continuous service in both high and low temperature ball bearing operation.

In general the channeling type lubricating grease compositions described above are excellent for lubricating ball bearings. These greases, however, are less desirable for use in roller bearings since different and more complex lubrication problems exist in these bearings. It has been found that the action of both ball and roller bearings causes the high soap content grease compositions to become stiffer and the desired soft, unctuous characteristic necessary for bearing lubrication is lost. While this hardening is desirable in ball bearing use, allowing ease of channeling, it is undesirable in roller bearing service since hardening and channeling prevent satisfactory lubrication of the roller shoulders and back roller surfaces. This is particularly noticeable in double row bearings.

These prior art channeling greases also tend to harden on storage because of the unbalanced grease structure, that is, the abnormally high proportion of soap to oil base. Upon standing, the grease which has been churned or stirred down to the desired consistency (penetration) tends to settle, or "snap back" to the consistency which is normal for the high soap content.

In addition to the hardening action of these prior art lubricating grease compositions, one serious production handicap is the time used in cooling the grease formulation from kettle temperatures, approximately 480° F. to 520° F., to packaging and handling temperatures. This cooling ordinarily takes from 24 to 36 hours, thus tying up production equipment for an undesirable period of time.

The instant invention has as its object the formation of a lubricating grease having desirable high temperature properties suitable for use in ball or roller bearings by a process which utilizes a combination of a quick cooling technique coupled with a subsequent application of high rates of shear without concurrent mixing. This improved technique results in the following advantages.

1. Greases having channeling properties and proper consistency which will satisfactorily lubricate anti-friction bearings without undesirable loss of power, heat rise, or premature bearing failure.

2. Decreased tendency to harden during use in a roller bearing, thus maintaining the proper consistency to work into roller bearing crevasses and shoulders during use.

3. Decreased tendency to harden during storage, since the desired consistency (penetration) is achieved with a lesser amount of soap than was hitherto believed possible.

4. An obvious economic advantage due to retention of the required consistency for anti-friction bearing lubrication (200–350 mm./10 penetration) with considerably smaller amounts of soap than the prior art has heretofore thought necessary.

5. A reduction of processing time from the ordinary 24 to 36 hours to about 2 to 10 hours.

Briefly speaking the instant invention involves a process for the preparation of high temperature lubricating grease compositions which comprises the steps of preparing a mixture of a complex soap and a low viscosity mineral oil, heating the mixture to a temperature above about 480° F. to completely dissolve the soap, and cooling the mixture to a temperature of about room temperature to 250° F. at a cooling rate such that an overall cooling time of from 2 to 10 hours is required. When the formulation has reached this temperature additional mineral oil of a viscosity index substantially higher than that of the base oil used is added and the total mixture is subjected to high rates of shear without concurrent mixing to form the desired final product.

As was stated above the first step in the improved process is the formation of a mixture of a complex soap and a mineral oil.

By complex soap is meant those thickening agents which comprise a complex of two or more components. Complexes may be formed from high molecular weight acid soaps and low molecular weight acid salts, such as the salts of acetic, acrylic, methacrylic, furoic acid, etc. Rapeseed oil soap is one such complex soap and is utilized in the preferred embodiment of this invention.

It has been found in the prior art that the metallic soaps, preferably the sodium soaps of refined unblown rapeseed oil, produces a grease formulation having desirable high temperature properties. The sodium soap of rapeseed oil is ordinarily prepared by admixing the rapeseed oil with a portion of a mineral base oil, usually the coastal type oil having excellent soap solvency properties but relatively low flash and correspondingly high volatility inherent in lube oils derived from aromatic type crudes. A viscosity index within the range of from about 45 to 60 is desirable. An aqueous solution of the desired metal hydroxide is then added. The temperature is raised gradually to one at which the neutralization products of the rapeseed oil becomes completely soluble. Ordinarily this will be within the range from about 480° to 520° F. or higher.

Any addition agents used such as oxidation inhibitors, petroleum sulfonates and the like, are added along with any additional quantity of the base oil used prior to the final temperature attained, that is, they are usually added at a temperature in the range of 250° F. to 300° F.

In the prior art it has been the general procedure to allow the mixture to cool slowly to packaging and handling temperatures, that is, to about 200° F. to 275° F. It had been found that this slow cooling technique resulted in the grease composition having longer lubrication life and superior structure characteristics. It has been postulated that is is due to a gradual increase in soap particle size to the optimum.

As was pointed out above this slow cooling technique results in product equipment tie-up and is overall economically unadvantageous. The procedure of the instant invention involves the elimination of this long cooling time by a rapid chilling procedure. This may be done by circulating cold water through the kettle jacket or any other method of rapid heat exchange known to the art. With the instant process these cooling times of from 24 to 36 hours may be shortened to from 2 to 10 hours, depending on the form of heat exchanger used.

Once the grease formulation is cooled there is added thereto an additional quantity of a highly refined paraffinic base mineral oil having a viscosity index within the range of from 80 to 115 and the total mixture is then subjected to a high rate of shear without concurrent mixing.

It is essential that the mineral oil used to "cut back" the grease formulation have a high flash point with corresponding low volatility and be of a natural high viscosity index within the stated range. The effect of any viscosity index improvers added to the mineral oil is lost since the improvers crystallize out on the soap particles and the original viscosity index of the base oil is the only effective one. This type of oil cannot be employed as the initial soap dispersant due to insolubility of the molten soap. It has also been found that if the grease formulation is prepared by the ordinary slow cooling method additional high viscosity index mineral oils cannot be incorporated therein.

After the grease formulation has been cut back with the high viscosity index oil the total mixture is subjected to rates of shear in the order of 10,000 to 500,000 or more in an apparatus designed to deliver these rates of shear without concurrent mixing. This equipment is so designed as to cause the grease to flow at high velocity and high pressure under streamlined conditions. Equipment such as the Gaulin homogenizer, manufactured and sold by the Manton-Gaulin Manufacturing Company of Everett, Massachusetts, or rolling mills wherein the grease formulation passes through steel rollers with minute clearances may be used. The well known Morehouse Mill wherein the milled material passes through spinning discs at low clearances is also operable but less desirable. A pressure viscosimeter if operated at sufficiently high pressures to deliver rates of shear within the desired range may be used to achieve the desired results. Various other mechanical means may also be used for the application of this shearing force to the grease formulation so long as there is present no concurrent mixing.

To recapitulate breifly the process of this invention involves the steps of making a mixture of a complex soap such as a soap of rapeseed oil and a low viscosity index mineral oil of desired solvency properties for the soap thickener, heating to a temperature sufficient to completely dissolve the soap, quickly cooling to a temperature below the transition temperature of the soap, that is, the temperature at which crystallization of the soap occurs, adding a high viscosity index mineral oil and subjecting the total formulation to rates of shear in the order of 10,000 to 500,000 reciprocal seconds, preferably 100,000 to 400,000 without concurrent mixing.

The original soap content used will be such as to give a grease formulation containing from 20% to 50% soap before the addition of the high viscosity index mineral oil. It has been found that by the former slow cooling method of the prior art a soap content within this range is required to give the desired ASTM penetration of 200 and 350 mm./10. The additional quantity of high viscosity index mineral oil added will be such as to reduce the overall soap content of the final product to one within a range of from 6 to 18%. The subsequent treating step, subjection to the high rates of shear without concurrent mixing, results in a finished product having a penetration value of between 200 and 350 mm./10, preferably 275 and 300 mm./10. It is to be noted that in addition to appreciably reducing the cooling time needed a lubricating grease having a penetration within the desired range is obtained with a fractional amount of the total soap content hitherto thought necessary.

The lubrication life of an anti-friction bearing lubricant has been thought to be generally proportional to the amount of soap present. It has been found that the lubricating compositions of this invention containing approximately ¼ to ⅓ the amount of soap hitherto thought necessary, gives a lubricating life comparable to the prior art greases. This is due to the incorporation of the high viscosity index oil, a result that cannot be achieved using the ordinary slow cooling techniques familiar to the prior art.

The instant invention will be more clearly explained by reference to the following examples.

*Example I*

By the procedure outlined in detail below, a grease composition having the following formulation was prepared:

| Ingredients | Percent By Weight |
|---|---|
| Rapeseed Oil | 22.00 |
| Sodium petroleum sulfonate solution | 0.50 |
| Sodium hydroxide | 4.75 |
| Oxidation inhibitor | 1.00 |
| Metal deactivator | 0.50 |
| Mineral oil (from a coastal crude)—300 vis./100° F. (V. I. 50) | 71.25 |

*Manufacturing procedure.*—The rapeseed oil, sodium petroleum sulfonate (50% solution in oil), and one third of the mineral oil were charged to a fire-heated grease kettle and warmed to 150° F. An aqueous solution of sodium hydroxide (40%) was charged and the mass heated while stirring to 300° F. After dehydration of the mass, the balance of the mineral oil was added and the grease was heated to 500° F. At this temperature heating was discontinued and the grease cooled to 200° F. While cooling (about 275° F.) the inhibitors were added. At 200° F. the grease was drawn and filtered. The cooling rate in this example was such that from 20 to 22 hours was needed to reach the packaging temperature of 200° F.

This grease composition had the following standard grease inspections:

ASTM penetration (mm./10, 77° F.):
    Unworked _____ 318
    Worked (60 strokes) _____ 326
    Worked (100,000 strokes) _____ 317

Dropping point (° F.) _____ 500+
Free alkalinity (as per cent NaOH) _____ 0.32
Norma Hoffman oxidation test (hours to 5 p. s. i.
 drop in oxygen pressure) _____ 286

This grease was submitted to the standard ABEC–NLGI 204 ball bearing spindle life test and gave excellent results. This test is described in detail in the literature and consists, briefly, of operating a 204 ball bearing lubricated with the test sample at 10,000 R. P. M. at a temperature of 250° F. until the bearing fails. The grease of Example 1 gave a lubrication life of 1900 hours.

*Example II*

A second grease composition was prepared utilizing 75% by weight of the finished formulation of Example I blended with 25% by weight of additional mineral oil, the same oil as used in formulating the grease of Example I. The formulation contained 18% soap as compared to the 24% of the grease of Example I and was too soft for the standard inspection tests. Accordingly, it was run through a Gaulin homogenizer at 5000 p. s. i. pressure. This subjection to high rates of shear without concurrent mixing caused the blend to harden into a solid grease and the material, when subjected to the standard inspections gave the following results:

ASTM penetration (mm./10, 77° F.):
 Unworked _____ 285
 Worked (60 strokes) _____ 311
Dropping point (° F.) _____ 440
Norma Hoffman oxidation test (hours to 5 p. s. i.
 drop in oxygen pressure) _____ 320

The grease of Example II was submitted to the ABEC–NLGI spindle life test and gave a spindle life of 1605 hours.

*Example III*

An attempt was made to repeat Example II using as a cut back oil a high viscosity index oil obtained by phenol extracting a Mid-Continent crude. The oil had the following inspections:

Gravity, ° API _____ 29.5
Color (Robinson) _____ 9
Flash point _____ ° F__ 475
Fire point _____ ° F__ 515
Viscosity, 100° F_____SUS__ 383.9
Viscosity, 210° F_____SUS__ 58.2
Viscosity index _____ 103.2
Pour point _____ ° F__ 15

The resulting composition was a semi-fluid mixture which would not harden to a grease consistency even after recycling through the Gaulin homogenizer at 5000 p. s. i. pressure.

*Example IV*

Using the formulation and procedure of Example I a fourth grease composition was prepared. In this preparation one major change in the manufacturing procedure was made. Instead of allowing the grease batch to cool slowly from 500° F. to 200° F., the finished grease formulation was rapidly chilled, the cooling time elapsing being only 8 to 10 hours instead of the 20–22 hours of the grease of Example I. Standard inspection results on this formulation are as follows:

ASTM penetration (mm./10, 77° F.):
 Unworked _____ 275
 Worked (60 strokes) _____ 269
 Worked (100,000 strokes) _____ 274
Dropping point, ° F _____ 500+
Free alkalinity (as per cent NaOH) _____ 0.32
Norma Hoffman oxidation test (hours to 5 p. s. i.
 oxygen pressure drop) _____ 275

This grease gave a spindle life of 1315 hours in the ABEC–NLGI spindle life test.

*Example V*

75% of the grease of Example IV was mixed with 25% of additional base oil, the low VI Coastal type distillate described in Example I. The resulting mixture was subjected to high rates of shear without concurrent mixing by subjecting it to 5 passes through the Gaulin homogenizer at 3000 p. s. i. The resulting grease gave the following standard inspections:

ASTM penetration (mm./10, 77° F.):
 Unworked _____ 195
 Worked (60 strokes) _____ 201
Dropping point, ° F _____ 465
Norma Hoffman oxidation test _____hours__ 268

This grease gave a lubrication life of 927 hours in the ABEC–NLGI spindle test.

*Example VI*

The grease of this example was made by combining 50% by weight of the grease of Example IV with 50% by weight of additional base oil. This resulted in an overall soap content of 12%. This grease was also homogenized in a Gaulin homogenizer at 5000 p. s. i. and the resulting grease gave the following inspections:

ASTM penetration (mm./10, 77° F.):
 Unworked _____ 270
 Worked (60 strokes) _____ 276
Dropping point, ° F _____ 400
Norma Hoffman oxidation test _____hours__ 340

This grease gave an ABEC–NLGI spindle life of 769 hours.

*Example VII*

This grease was prepared by blending with 50% by weight of the grease of Example IV 50% by weight of the high viscosity index oil as described in Example III. When subjected to high rates of shear without concurrent mixing in the Gaulin homogenizer, an excellent appearing stable grease structure resulted which gave the following inspections:

ASTM penetration (mm./10, 77° F.):
 Unworked _____ 299
 Worked (60 strokes) _____ 300
Dropping point °F_____ 385
Norma Hoffman oxidation test (hours to 5 p. s. i.
 oxygen pressure drop)_____ 220

This grease was submitted to the ABEC–NLGI spindle life test and gave a spindle life of 1365, an outstanding result for a grease containing only 12% soap.

The data presented in Examples I to VII above are tabulated below:

| Example | Percent Soap | Rate of Cooling | V. I. of added oil | Homogenization | Worked Penetration, mm./10 | ABEC–NLGI Spindle Life (Hours) |
|---|---|---|---|---|---|---|
| I_____ | 24 | Slow__ | None_ | No____ | 326 | 1,900 |
| II_____ | 18 | Slow__ | Low__ | Yes___ | 311 | 1,605 |
| III____ | 18 | Slow__ | High__ | Yes___ | (¹) | (¹) |
| IV_____ | 24 | Fast__ | None_ | No____ | 269 | 1,315 |
| V_____ | 18 | Fast__ | Low__ | Yes___ | 201 | 927 |
| VI_____ | 12 | Fast__ | Low__ | Yes___ | 276 | 769 |
| VII____ | 12 | Fast__ | High__ | Yes___ | 300 | 1,365 |

¹ No grease structure.

This data and the accompanying drawing point out the improvement to which the instant process relates. Examples I and II show that a grease having good structural characteristics and good spindle life may be prepared by cutting a slow cooled prior art 24% soap grease to 18% soap content with a low viscosity index oil followed by homogenization. Example III points out that a high viscosity oil may not be used as a cut back oil when the slow cooling technique is used. Examples IV to VI show that when a quick cooled grease is cut back with a low viscosity index oil lower spindle life results are obtained. Example VII illustrates the invention in that it clearly points out the advantages of the instant process. A grease having only 12% soap is prepared by the quick cooling technique and yet its spindle life is greatly improved and its structure is within the desired penetration range.

To summarize briefly this invention comprises the steps of preparing channeling type high temperature lubricating grease compositions which are useful for the lubrication of anti-friction bearings which comprises admixing a complex soap with a low viscosity mineral base lubricating oil that is of a viscosity index below about 60. The mixture is then heated to a temperature which is sufficient to completely dissolve the soap. The solution of oil and soap is then quickly chilled to a temperature which is below the transition temperature of the soap, that is, the temperature at which the crystallization of the soap occurs. After the soap has been cooled there is admixed therewith an additional quantity of the mineral oil but one having a viscosity index that is substantially higher than that of the base oil. Highly refined paraffinic oils having viscosity indices of about 80 to about 115 are especially desirable. The total mixture is then hardened to an ASTM penetration within the range of about 200 to 350 mm./10 by subjecting to high rates of shear without concurrent mixing. Rates of shear in the order of 10,000 to 500,000 reciprocal seconds, preferably 100,000 to 400,000 are operable. If desired additive materials such as sulfonate anti-oxidant tackiness agents and the like may be added to the grease formulations by methods known to the art.

What is claimed is:

1. A process for the preparation of channeling type high temperature anti-friction bearing lubricating grease compositions which comprises the steps of admixing with a mineral base lubricating oil from 20% to 50% by weight of a grease forming complex soap, heating to a temperature sufficient to completely dissolve said complex soap, rapidly cooling said heated mixture to a temperature below the transition temperature of the soap, then adding a quantity of a mineral lubricating oil having a viscosity index substantially higher than that of said base oil, said quantity being sufficient to result in a formulation containing from 6% to 18% by weight of soap and subjecting the mixture to the action of rates of shear in the order of 10,000 to 500,000 reciprocal seconds under streamlined conditions to obtain a grease composition having an ASTM penetration within the range of from 200 to 350 mm./10.

2. A process according to claim 1 wherein said complex soap is a rapeseed oil soap.

3. A process for the preparation of channeling type high temperature anti-friction bearing lubricating grease compositions which comprises the steps of admixing from 20% to 50% by weight of a complex soap with a mineral base lubricating oil having a viscosity index within the range of from 45 to 60, heating the mixture to a temperature sufficient to completely dissolve said complex soap, rapidly cooling said heated mixture to a temperature below the transition temperature of said soap, then adding a mineral lubricating oil having a viscosity index within the range from 80 to 115 in a quantity sufficient to reduce the overall soap content to one within the range from 6% to 18% and subjecting the mixture to the action of rates of shear in the order of 100,000 to 400,000 reciprocal seconds under streamlined conditions to obtain a grease composition having an ASTM penetration within the range of from 200 to 350 mm./10.

4. A process according to claim 3 wherein said complex soap is the sodium soap of rapeseed oil.

5. A process for the preparation of channeling type high temperature anti-friction bearing lubricating grease compositions which comprises the steps of admixing a sodium soap of rapeseed oil with a mineral lubricating oil having a viscosity index of about 55 in amounts sufficient to result in a mixture containing approximately 24% soap, heating the resulting mixture to a temperature of about 450° F. to 500° F., rapidly cooling said heated mixture to a temperature within the range of from room temperature to 250° F., then adding a sufficient quantity of a mineral lubricating oil having a viscosity index of about 103 to result in a mixture containing approximately 12% soap, subjecting the mixture to the action of rates of shear in the order of of from 100,000 to 500,000 under streamlined conditions, and obtaining a grease composition having an ASTM penetration within the range of from 200 to 350 mm./10.

References Cited in the file of this patent

UNITED STATES PATENTS

| | | |
|---|---|---|
| 2,265,791 | Zimmer et al. | Dec. 9, 1941 |
| 2,318,668 | Calkins | May 11, 1943 |
| 2,383,906 | Zimmer et al. | Aug. 28, 1945 |
| 2,431,453 | Beerbower et al. | Nov. 25, 1947 |
| 2,461,276 | Hetherington | Feb. 8, 1949 |
| 2,516,137 | Morway et al. | July 25, 1950 |
| 2,588,279 | O'Halloran | Mar. 2, 1952 |
| 2,598,154 | Bailey et al. | May 27, 1952 |
| 2,599,343 | Morway et al. | June 3, 1952 |
| 2,610,947 | Morway | Sept. 16, 1952 |

FOREIGN PATENTS

| | | |
|---|---|---|
| 18,249 | Great Britain | Aug. 19, 1902 |
| 22,875 | Great Britain | Nov. 15, 1903 |
| 22,941 | Great Britain | Nov. 8, 1905 |

OTHER REFERENCES

Design of Emulsifying Machines, Robert Johnson; found in text of Emulsion Technology, pages 88–118, 2nd ed.; Chemical Pub. Co., Inc., Brooklyn, N. Y.